US009250964B2

(12) United States Patent
Yellin

(10) Patent No.: US 9,250,964 B2
(45) Date of Patent: Feb. 2, 2016

(54) CONCURRENT COMPUTING WITH REDUCED LOCKING REQUIREMENTS FOR SHARED DATA

(71) Applicant: International Business Machines Corporation, Armonk, NY (US)

(72) Inventor: Daniel M. Yellin, Jerusalem (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 14/010,591

(22) Filed: Aug. 27, 2013

(65) Prior Publication Data

US 2015/0067694 A1  Mar. 5, 2015

(51) Int. Cl.
G06F 9/46    (2006.01)
G06F 9/50    (2006.01)
G06F 9/52    (2006.01)

(52) U.S. Cl.
CPC ............... *G06F 9/50* (2013.01); *G06F 9/5016* (2013.01); *G06F 9/52* (2013.01)

(58) Field of Classification Search
CPC ............ G06F 9/50; G06F 9/52; G06F 9/5016
USPC ........................................................ 718/104
See application file for complete search history.

(56) References Cited

U.S. PATENT DOCUMENTS

| 5,790,862 | A  | * | 8/1998 | Tanaka et al. | 717/159 |
| 6,219,728 | B1 | * | 4/2001 | Yin | 710/52 |
| 6,530,079 | B1 | * | 3/2003 | Choi | G06F 9/52 |
| | | | | | 712/227 |
| 6,601,083 | B1 | * | 7/2003 | Reznak | 718/104 |
| 7,032,222 | B1 | * | 4/2006 | Karp et al. | 718/104 |
| 7,035,870 | B2 | * | 4/2006 | McGuire | G06F 9/52 |
| | | | | | 707/704 |
| 7,228,549 | B2 | * | 6/2007 | Todd et al. | 719/312 |
| 8,145,817 | B2 |   | 3/2012 | Detlefs | |
| 8,612,940 | B2 | * | 12/2013 | Kahlon | G06F 9/524 |
| | | | | | 717/104 |

(Continued)

OTHER PUBLICATIONS

Bhargava, "A Causal Model for Analyzing Distributed Concurrency Control Algorithms", 1983 IEEE, pp. 470-486.*
Rajwar, "Speculation-Based Techniques for Transactional Lock-Free Execution of Lock-Based Programs", 2002, University of Wisconsin—Madison, pp. i-xiii, 1-209.*

(Continued)

*Primary Examiner* — Van Nguyen
(74) *Attorney, Agent, or Firm* — Cuenot, Forsythe & Kim, LLC

(57) ABSTRACT

Where data are shared by multiple computer processing threads, modifying the data by determining whether modifying data associated with a first computer processing thread violates a constraint associated with the data, and responsive to determining that modifying the data associated with the computer processing thread violates the constraint associated with the data, using the data associated with the first computer processing thread to modify the data shared by the multiple computer processing threads that includes the first computer processing thread, where the constraint associated with the data associated with the first computer processing thread represents a portion of a tolerance value that is associated with the data shared by the multiple computer processing threads and that is divided among multiple constraints, where each of the constraints is associated with a different one of the multiple computer processing threads.

17 Claims, 3 Drawing Sheets

(56) References Cited

U.S. PATENT DOCUMENTS

| | | | |
|---|---|---|---|
| 8,874,751 B2* | 10/2014 | Fawcett | H04L 67/1002 709/203 |
| 2006/0117318 A1* | 6/2006 | Rumelhart et al. | 718/104 |
| 2007/0027870 A1* | 2/2007 | Kim et al. | 707/8 |
| 2007/0256077 A1* | 11/2007 | Zhong | 718/104 |
| 2008/0256545 A1* | 10/2008 | Akidau et al. | 718/104 |
| 2009/0228473 A1* | 9/2009 | Kannan et al. | 707/5 |
| 2010/0174745 A1* | 7/2010 | Ryan et al. | 707/770 |
| 2010/0235496 A1* | 9/2010 | Zhao | 709/224 |
| 2011/0202907 A1 | 8/2011 | Dice et al. | |
| 2011/0252408 A1 | 10/2011 | Tzoref et al. | |
| 2011/0276969 A1 | 11/2011 | Kahlon et al. | |
| 2012/0011492 A1 | 1/2012 | Sinha et al. | |
| 2012/0047353 A1 | 2/2012 | Gupta et al. | |
| 2012/0159502 A1* | 6/2012 | Levin et al. | 718/104 |
| 2012/0174082 A1 | 7/2012 | Dolby et al. | |

OTHER PUBLICATIONS

Balasubramonian, R., "Relaxed Consistency Models", [online] Parallel Computer Architecture Course, School of Computing, The University of Utah, Spring 2008, retrieved from the Internet: <http://www.cs.utah.edu/~rajeev/cs7820/pres/7820-12.pdf>.

Preshing, J., "An Introduction to Lock-Free Programming", Hacker Monthly, Issue 29, Jun. 2012, 8 pg.

Kahlon, V. et al., "Lock Removal for Concurrent Trace Programs", Computer Aided Verification, Lecture Notes in Computer Science, vol. 7358, pp. 227-242, 2012, 16 pg.

Rolf, C.C. et al., "Parallel Consistency in Constraint Programming", 3rd Int'l Workshop on Scalable Distributed and Multi/Many-core Applications and Systems (SDMAS'09) within PDPTA'09, 2009. 7 pg.

* cited by examiner

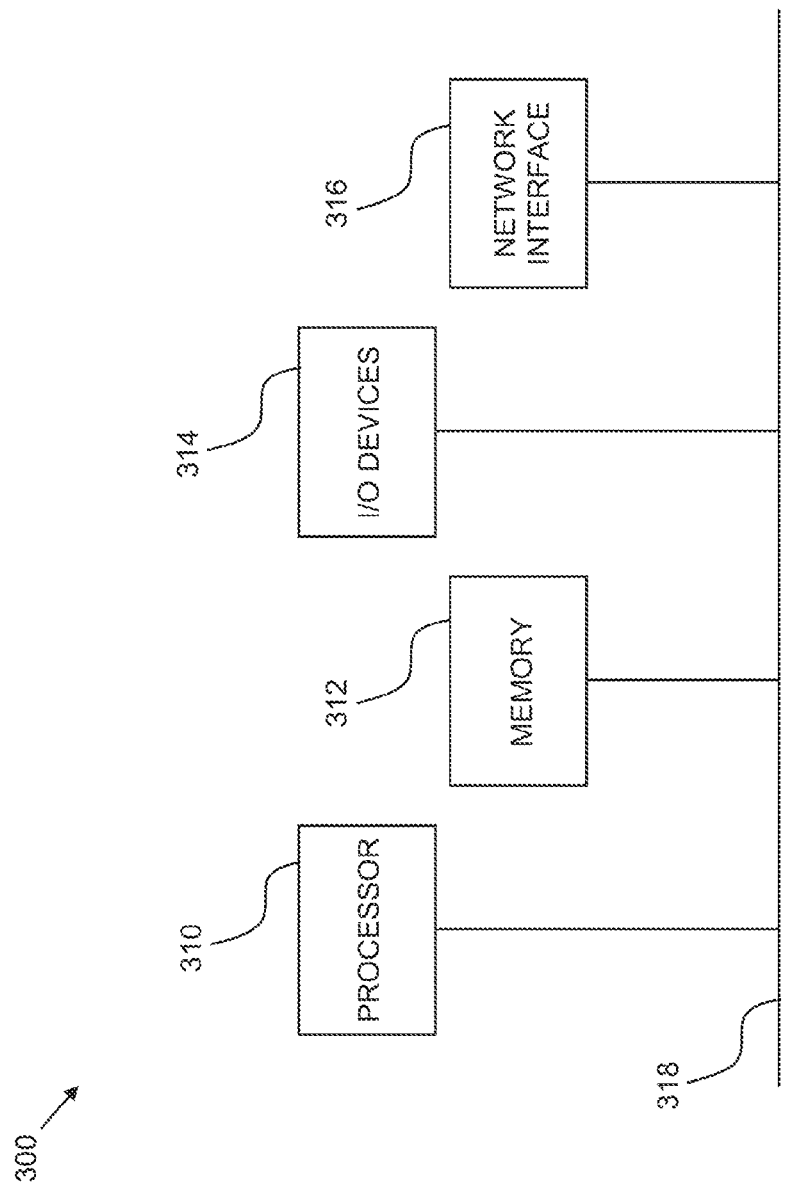

CONCURRENT COMPUTING WITH REDUCED LOCKING REQUIREMENTS FOR SHARED DATA

FIELD OF THE INVENTION

The invention relates in general to concurrent computing techniques.

BACKGROUND OF THE INVENTION

With the advent of massive multi-core computer processing architectures, it is increasingly a challenge to adapt software to take optimal advantage of the concurrent processing capabilities of such architectures. For example, if method A in one computer processing thread updates a data object, and method B in another computer processing thread reads or updates the data object, then if A and B run concurrently, B may read inconsistent values. To remedy this, programming languages and libraries typically provide support for synchronization and locking, allowing a programmer to guarantee that methods or critical sections of software code are accessed by only one thread at a time. These techniques guarantee consistency but can greatly limit the amount of concurrency in a system and can result is very poor utilization of the cores in a multi-core system. Existing approaches attempt to solve this problem for the most part by decreasing the overhead of synchronization primitives. However, there is a limit on how much this can improve the performance of a concurrent computing system.

SUMMARY OF THE INVENTION

In one aspect of the invention a method is provided for modifying data shared by multiple computer processing threads, the method including determining whether modifying data associated with a first computer processing thread violates a constraint associated with the data, and responsive to determining that modifying the data associated with the computer processing thread violates the constraint associated with the data, using the data associated with the first computer processing thread to modify data shared by multiple computer processing threads that includes the first computer processing thread, where the constraint associated with the data associated with the first computer processing thread represents a portion of a tolerance value that is associated with the data shared by the multiple computer processing threads and that is divided among multiple constraints, where each of the constraints is associated with a different one of the multiple computer processing threads.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION OF THE INVENTION

Figure 1:
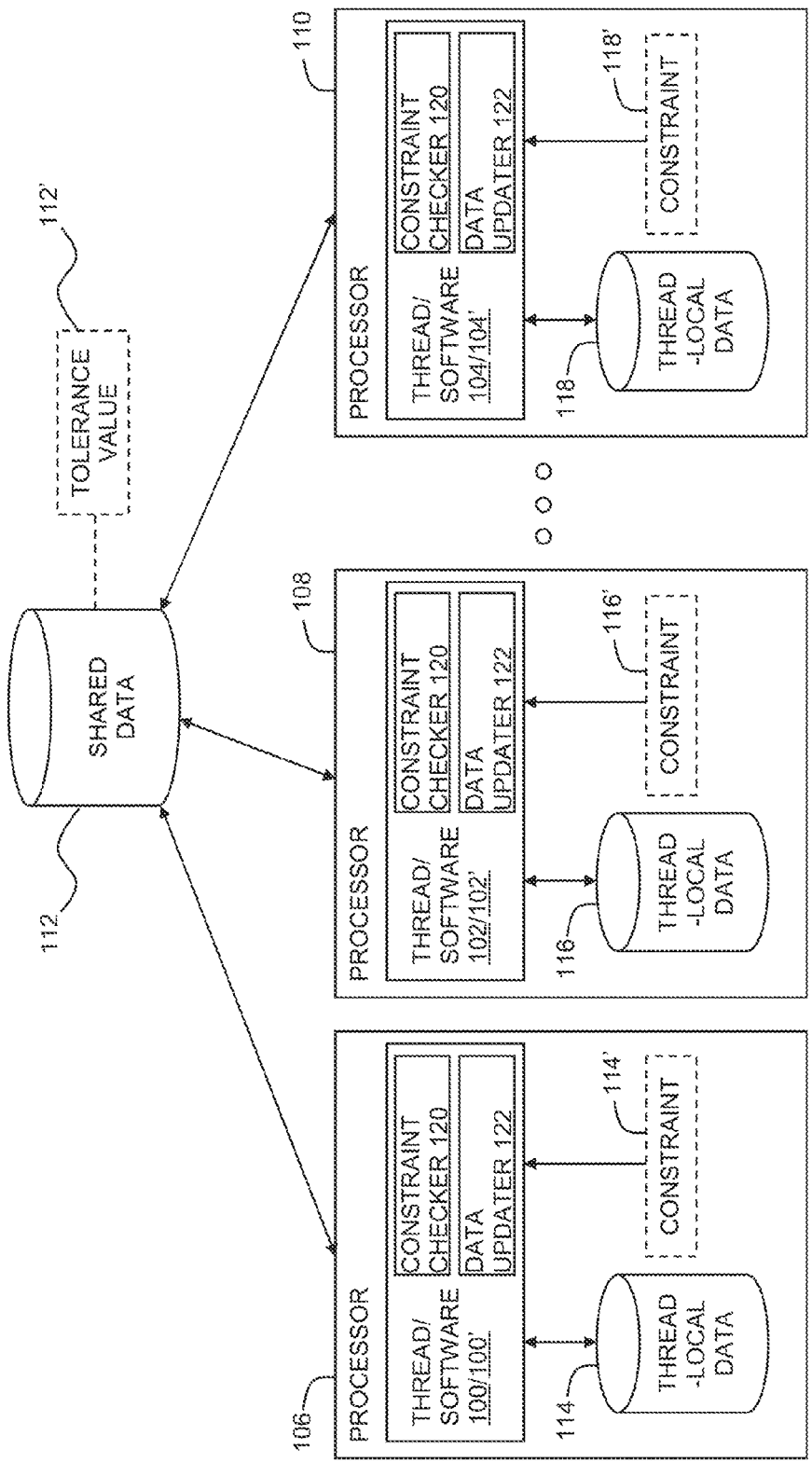
FIG. 1 is a simplified conceptual illustration of a concurrent computing system with reduced locking requirements for shared data, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a concurrent computing system with reduced locking requirements for shared data, constructed and operative in accordance with an embodiment of the invention. In the system of FIG. 1, multiple computer processing threads 100, 102, and 104, are shown being concurrently executed by computer processors 106, 108, and 110 respectively, which may, for example, be multiple processing cores in a multi-core computer system. Computer processing threads 100, 102, and 104 represent the execution of computer software 100', 102', and 104' respectively, and thus references herein to computer processing threads 100, 102, and 104 may be understood to refer to computer software 100', 102', and 104', and vice versa. Each of computer processing threads 100, 102, and 104 executes different computer software, different instances of the same computer software, or any combination thereof.

Computer software 100', 102' and 104' are each preferably configured to read and modify shared data 112, stored at a single computer memory location, where shared data 112 may, for example, be a single numeric value or a set of multiple data elements. Thread-local data 114, 116, and 118 are of the same data type as shared data 112, represent data stored at different respective computer memory locations, and are associated with computer processing threads 100, 102, and 104 respectively. References herein to shared data 112 and thread-local data 114, 116, and 118 may be understood to refer to their respective memory locations where their data are stored, as well as to their data.

The actual value of shared data 112 may be differentiated from the visible value of shared data 112 at any given time as follows. The actual value of shared data 112 is obtained from shared data 112 and thread-local data 114, 116, and 118. For instance, if shared data 112 is of a numeric type, then the actual value of shared data 112 is the sum of the data stored at shared data 112 and thread-local data 114, 116, and 118. If shared data 112 is a set of multiple data elements, then the actual value of shared data 112 is the union of the elements stored at shared data 112 and thread-local data 114, 116, and 118. In contrast, the visible value of shared data 112 is simply the value of the data stored at shared data 112.

A tolerance value 112' is associated with shared data 112, where tolerance value 112' sets an upper bound and/or lower bound for the difference between the visible value of shared data 112 and its actual value. This bound describes how much the visible value of the shared memory 112 may differ from its actual value. The nature of tolerance 112' will depend upon the type of shared data 112. If, for instance, the shared data is of numeric type, then tolerance 112' may be an absolute numeric value representing the extent to which the visible value of shared memory 112 may differ from its actual value, being the sum of the data stored at shared data 112 and thread-local data 114, 116, and 118. Alternatively, tolerance 112' may be a percentage indicating by what percent the visible value of shared memory 112 may differ from its actual value.

Computer software 100', 102', and 104' are each configured to read shared data 112, but any modifications by computer software 100', 102', and 104' that are intended for shared data 112 are instead performed on their associated thread-local data 114, 116, and 118. Computer software 100', 102', and 104' are further configured such that each of their associated threads is able to modify its own thread-local data, but not the thread-local data associated with any other thread. Tolerance value 112' that is associated with shared data 112 is preferably divided into constraints 114', 116', and 118' that are associated with thread-local data 114, 116, and 118 respectively, where constraints 114', 116' and 118' indicate what values are valid for thread-local data 114, 116, and 118 respectively. For instance, if thread-local data 114, 116, and 118 are of numeric type, then constraints 114', 116', and 118' set numeric upper bounds and/or lower bounds for the values of their associated thread-local data 114, 116, and 118. Thus, if constraints 114', 116' and 118' are satisfied, then tolerance value 112' will also be satisfied. For example, if tolerance value 112' indicates that the visible value of shared data 112 cannot differ from its actual value by more than 90, then constraints 114', 116', and 118' may each indicate that each of thread-local data 114, 116, and 118 cannot have an absolute value that exceeds 30.

Computer software 100', 102', and 104' are each preferably configured with a constraint checker 120 and a data updater 122. Constraint checker 120 is preferably configured to determine whether modifying its associated thread-local data violates the constraint associated with its associated thread-local data, and preferably makes this determination when any of computer software 100', 102', and 104' wishes to modify shared data 112. Data updater 122 is preferably configured such that when any of computer software 100', 102', and 104' in any of threads 100, 102, and 104 wishes to modify shared data 112, data updater 122 instead modifies the thread-local data associated with the thread if modifying the thread-local data does not cause the thread-local data to violate the constraint associated with the thread-local data. However, if modifying the thread-local data does cause the thread-local data to violate the constraint associated with the thread-local data, data updater 122 uses the thread-local data associated with the thread to modify shared data 112, such as by adding its thread-local data to shared data 112, preferably after locking shared data 112 for exclusive access by the thread whose computer software is modifying shared data 112.

Any of the elements shown in FIG. 1 are preferably implemented in computer hardware and/or in computer software embodied in a non-transitory, computer-readable medium in accordance with conventional techniques.

Figure 2:
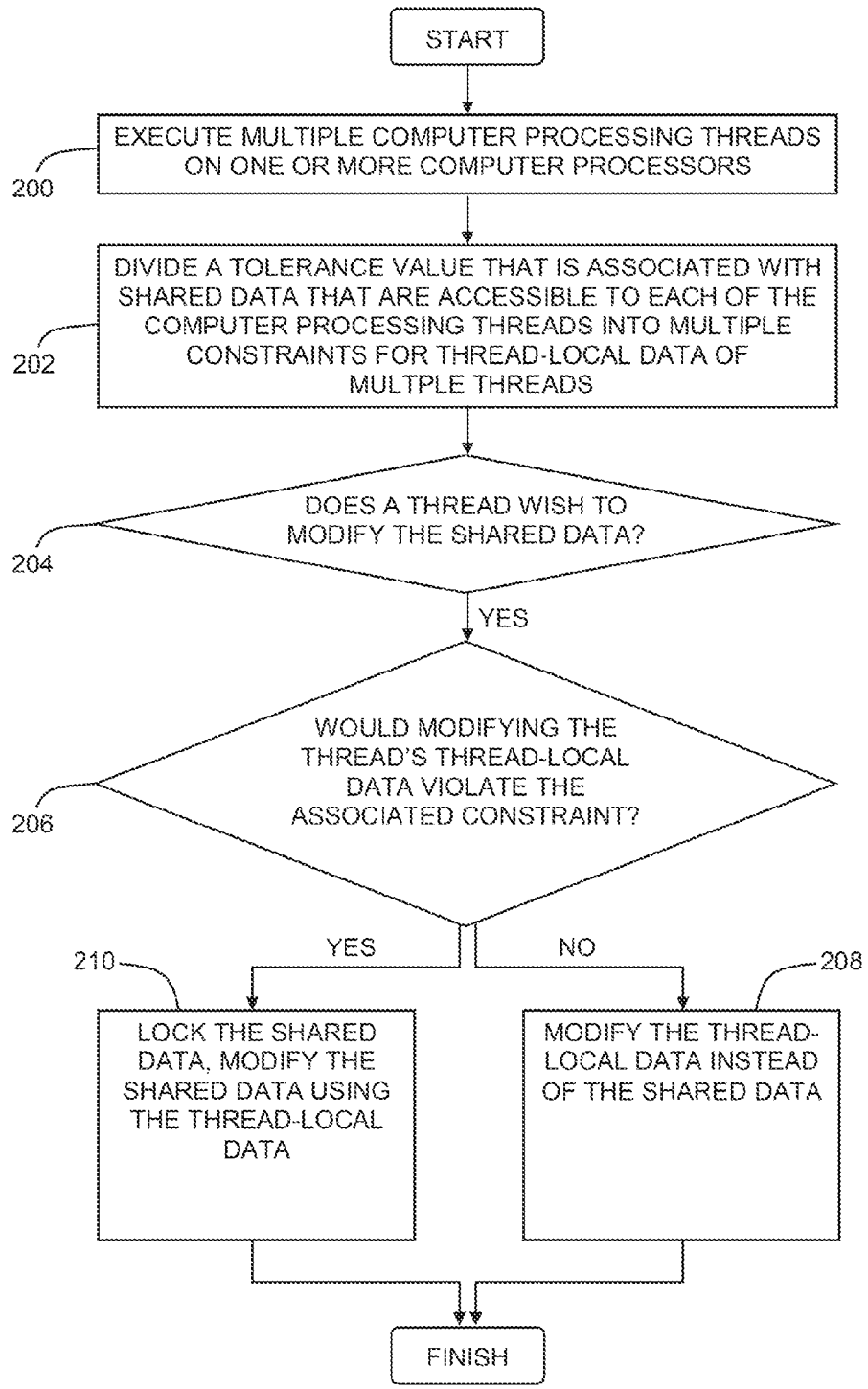
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 multiple computer processing threads are concurrently executed by one or more computer processors, where the different computer processing threads represent the execution of different computer software, different instances of the same computer software, or any combination thereof (step 200). A tolerance value that is associated with shared data that are accessible to each of the computer processing threads is divided into multiple constraints, where each of the multiple constraints is associated with different thread-local data, and where each of the thread-local data are associated with a different thread (step 202). When any of the computer software in any of the threads wishes to modify the shared data (step 204), if modifying its associated thread-local data would not violate the constraint associated with its thread-local data (step 206), then the computer software instead modifies its associated thread-local data (step 208). Otherwise, the computer software uses its associated thread-local data to modify the shared data, preferably after locking the shared data for exclusive access by the thread whose computer software is modifying the shared data (step 210).

The system of FIG. 1 and method of FIG. 2 may be illustrated in the context of the following examples. In one example the shared data is a numeric value, representing the value of a variable v, and supporting Add or Subtract operations, which add or subtract some value from the shared data. The thread-local data represent additional values to be added to the shared data value (although if the thread-local data value may be negative, adding a negative thread-local data value to the shared data value is, in effect, a subtraction of the thread-local data value from the shared data value). The actual value of the variable v at any given time is therefore the shared data value that is visible to the computer processing threads (hereinafter v_vis) plus all of the thread-local data values of each of the computer processing threads. The tolerance value that is associated with the shared data value expresses bounds on how much the shared data value v_vis may vary from the actual value of v. For example, a software application that tracks a municipal transportation system, where v is the number of passengers currently riding the system, may tolerate v_vis to be ±100 of v. Where there are 20 threads, the tolerance value may be divided into constraints on each of the 20 thread-local data values. In this case, each constraint represents a local tolerance value that indicates that its associated thread-local data value cannot exceed ±5, although more generally the tolerance value need not be divided equally among the thread constraints.

This example is illustrated by the following simplified software instructions that perform an update operation, Add (num), which adds the value of num to v, where num may be either positive or negative:

```
Add(num)
    get lock for v
    v = v + num
    release lock for v
end
```

In accordance with prior art techniques, where multiple computer processing threads concurrently execute multiple instances of these instructions, the Add operation must lock the variable v, since multiple threads may try to update v simultaneously, and their updates may be lost due to race conditions. Alternatively, these instructions may be configured for use with the system of FIG. 1 and method of FIG. 2 as follows, where t[i] represents the absolute value that v[i] cannot exceed in order to satisfy the constraint:

```
Add(num)
    /* assume that thread i is executing this method */
    let v[i] be the thread-local data for thread i.;
    let t[i] be the constraint associated with v[i];
    v[i] = v[i] + num;
    if |v[i]| > t[i] then
        get lock for v_vis
        v_vis = v_vis + v[i]
        release lock for v_vis
        v[i] = 0
    end if
end
```

In another example the shared data v is a set or list of elements that supports the update operations Insert(element) and Delete(element) for inserting and deleting elements into the set v. The set v is represented by a set of tuples, where each tuple is either of the form <ts, "I", e> or <ts, "D", e>, where ts is a timestamp giving the time element e was inserted into or deleted from the set. Given this representation of the set, the value of the set can easily be computed by the following method: the set consists of those elements e for which there exists a tuple <ts, "I", e> and there does not exists a tuple <ts', "D", e> with ts'>ts. As will be explained below, the value of v may be computed in a multicore system within a stated tolerance, where v incorporates the tuple-based representation of the set described above. Once this value is obtained, it is easy to convert it to a set of elements.

The actual value of the variable v at any given time is the shared data value that is visible to the computer processing threads (hereinafter v_vis) plus the union of all of the thread-local data values of each of the computer processing threads. The tolerance value that is associated with the shared data value places bounds on how much the shared data value v_vis may vary from the actual value of v. In particular, it will state the number of elements that may be in v but not visible in v_vis, or that may not be in v but are visible in v_vis.

For example, a software application that tracks the employees in any company office, where v is the employees that are in the office at any given time, may tolerate v_vis to be within 100 of v, meaning that v_vis may list up to 100 employees incorrectly (e.g., they are either in a company building and not listed in v_vis or are not in a company building but are listed in v_vis). Where there are 20 threads, the tolerance value may be divided into constraints on each of the 20 thread-local data values. In this case, each constraint represents a local tolerance value that indicates that the size of its associated thread-local data (i.e., the number of elements it contains) cannot exceed ±5, although more generally the tolerance value need not be divided equally among the thread constraints.

The Insert(element) operation is illustrated by the following simplified software instructions:

```
Insert(element)
    get lock for v
    insert element into v
    release lock for v
end
```

In accordance with prior art techniques, where multiple computer processing threads concurrently execute multiple instances of these instructions, the Insert(element) operation must lock the variable v, since multiple threads may try to update v simultaneously, and their updates may be lost due to race conditions. Alternatively, these instructions may be configured for use with the system of FIG. 1 and method of FIG. 2 as follows, where t[i] represents the maximum number of elements that v[i] may contain in order to satisfy the constraint:

```
Insert(element)
    /* assume that thread i is executing this method */
    let v[i] be the thread-local data for thread i.;
    let t[i] be the constraint associated with v[i];
    insert element into v[i];
    if the number of elements in v[i] > t[i] then
        get lock for v_vis
        v_vis = v_vis union v[i]
        release lock for v_vis
        v[i] = empty set
    end if
end
```

It is appreciated that other set operations, such as Delete (element), may be performed in a similar fashion. It is further noted that various optimizations may be applied in the example given above. In particular, if an element e is deleted from or inserted into a set at time ts, all of the tuples involving e with a timestamp ts'<ts may be removed from the set. Furthermore, if there is a tuple <ts, "D", e> in v_vis, and there is no tuple <ts', "I", e> with ts'>ts in v_vis or in any thread-local data, than all tuples involving e may be deleted from v_vis. In order to make this determination an additional data structure may be maintained that lists the timestamp when each thread last updated v_vis.

In both of the examples above multiple instances of the software instructions that are configured for use with the system of FIG. 1 and method of FIG. 2 may run concurrently in multiple computer processing threads whose thread-local data values collectively represent how much the value of v has changed from its visible value. Only when a thread determines that modifying its thread-local data value would violate the constraint associated with its thread-local data value does the thread lock and modify the shared data value with its thread-local data value and reset its thread-local data value to the null element for that datatype (e.g., to 0 for a numeric datatype, or to the representation of the empty set for a set of data elements). Thus, instead of every thread locking the shared data for each update operation, each thread will only lock the shared data for selected update operations, thereby reducing the number of locking operations that would otherwise be required. Furthermore, although these threads make use of minimal locking, it can still be guaranteed that the visible value of the shared data will satisfy its associated tolerance value. Hence, any thread that reads the shared data will know that the value, although not necessary correct, will approximate the correct value in that it satisfies the tolerance value which indicates how close the visible value of the shared data is to the actual value of the shared data at any point in time.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method, comprising:
    determining, using a processor, whether modifying data associated with a first computer processing thread violates a constraint associated with the data; and
    using, responsive to a determination that the modifying the data violates the constraint associated with the data, the data to modify data shared by multiple computer processing threads that includes the first computer processing thread, wherein the constraint represents a portion of a tolerance value that is
        a) associated with the data shared by the multiple computer processing threads
    and
        b) divided among a plurality of constraints and each of the plurality of constraints is associated with a different one of the multiple computer processing threads,
    wherein
        each of the multiple computer processing threads has an associated own thread-local data for storing modifications intended for the data shared by the multiple computer processing threads, and
        a tolerance value associated with the data shared by the multiple computer processing threads sets a bound for a difference between
            i) an aggregate of the data shared by the multiple computer processing threads and the thread-local data of the multiple computer processing threads and
            ii) the data shared by the multiple computer processing threads.

2. The method according to claim 1, further comprising configuring a set of computer software instructions to perform the determining and the using.

3. The method according to claim 2, further comprising causing each of the multiple computer processing threads to execute a different instance of the computer software instructions.

4. The method according to claim 1, wherein the data shared by the multiple computer processing threads is a single numeric value.

5. The method according to claim 1, wherein the data shared by the multiple computer processing threads is a set of multiple elements.

6. The method according to claim 1, wherein each of the multiple computer processing threads has an associated own thread-local data for storing modifications intended for the data shared by the multiple computer processing threads.

7. The method according to claim 1, further comprising modifying the data associated with the first computer processing thread with a modification intended for the data shared by the multiple computer processing threads upon a determination that the modification does not violate the constraint.

8. A computer hardware system, comprising:
    at least one hardware processor configured to initiate the following executable operations:
        determining whether modifying data associated with a first computer processing thread violates a constraint associated with the data; and
        using, responsive to a determination that the modifying the data violates the constraint associated with the data, the data to modify data shared by multiple computer processing threads that includes the first computer processing thread,
    wherein the constraint represents a portion of a tolerance value that is
        a) associated with the data shared by the multiple computer processing threads
    and
        b) divided among a plurality of constraints and each of the plurality of constraints is associated with a different one of the multiple computer processing threads,
    wherein
        each of the multiple computer processing threads has an is associated own thread-local data for storing modifications intended for the data shared by the multiple computer processing threads, and
        a tolerance value associated with the data shared by the multiple computer processing threads sets a bound for a difference between
            i) an aggregate of the data shared by the multiple computer processing threads and the thread-local data of the multiple computer processing threads and
            ii) the data shared by the multiple computer processing threads.

9. The system of claim 8, wherein the at least one hardware processor is further configured to initiate the following executable operation:
    configuring a set of computer software instructions to perform the determining and the using.

10. The system of claim 9, wherein the at least one hardware processor is further configured to initiate the following executable operation:
    causing each of the multiple computer processing threads to execute a different instance of the computer software instructions.

11. The system of claim 8, wherein
    the data shared by the multiple computer processing threads is a single numeric value.

12. The system of claim 8, wherein
    the data shared by the multiple computer processing threads is a set of multiple elements.

13. The system of claim 8, wherein
    each of the multiple computer processing threads has an associated own thread-local data for storing modifications intended for the data shared by the multiple computer processing thread.

14. The system of claim 8, wherein the at least one hardware processor is further configured to initiate the following executable operation:
    modifying the data associated with the first computer processing thread with a modification intended for the data shared by the multiple computer processing threads upon a determination that the modification does not violate the constraint.

15. A computer program product comprising:
    a non-transitory, computer-readable storage medium storing computer-readable program code, wherein the computer-readable program code program code is executable by at least one processor to perform:

determining whether modifying data associated with a first computer processing thread violates a constraint associated with the data; and using, responsive to a determination that the modifying the data violates the constraint associated with the data, the data to modify data shared by multiple computer processing threads that includes the first computer processing thread, wherein the constraint represents a portion of a tolerance value that is a) associated with the data shared by the multiple computer processing threads and b) divided among a plurality of constraints and each of the plurality of constraints is associated with a different one of the multiple computer processing threads, wherein each of the multiple computer processing threads has an is associated own thread-local data for storing modifications intended for the data shared by the multiple computer processing threads, and a tolerance value associated with the data shared by the multiple computer processing threads sets a bound for a difference between i) an aggregate of the data shared by the multiple computer processing threads and the thread-local data of the multiple computer processing threads and ii) the data shared by the multiple computer processing threads.

16. The computer program product of claim 15, wherein each of the multiple computer processing threads has an associated own thread-local data for storing modifications intended for the data shared by the multiple computer processing thread.

17. The computer program product of claim 15, wherein the computer-readable program code program code is executable by the at least one processor to further perform:

modifying the data associated with the first computer processing thread with a modification intended for the data shared by the multiple computer processing threads upon a determination that the modification does not violate the constraint.

* * * * *